United States Patent
Frickey, III et al.

(10) Patent No.: US 10,025,535 B2
(45) Date of Patent: Jul. 17, 2018

(54) MEASUREMENT AND REPORTING OF THE LATENCY OF INPUT AND OUTPUT OPERATIONS BY A SOLID STATE DRIVE TO A HOST

(71) Applicant: Intel Corporation, Santa Clara, CA (US)

(72) Inventors: Robert E. Frickey, III, Sacramento, CA (US); Ye Zhang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/671,663

(22) Filed: Mar. 27, 2015

(65) Prior Publication Data
US 2016/0283119 A1    Sep. 29, 2016

(51) Int. Cl.
*G06F 13/00*    (2006.01)
*G06F 3/06*    (2006.01)

(52) U.S. Cl.
CPC ............ *G06F 3/0679* (2013.01); *G06F 3/061* (2013.01); *G06F 3/0653* (2013.01); *G06F 3/0688* (2013.01)

(58) Field of Classification Search
CPC ............... G06F 3/0611; G06F 13/4243; G06F 13/1636; G06F 13/1694; G06F 15/173
See application file for complete search history.

(56) References Cited

U.S. PATENT DOCUMENTS

| | | | |
|---|---|---|---|
| 8,321,627 B1 * | 11/2012 | Norrie | G06F 13/161 365/185.33 |
| 8,566,483 B1 | 10/2013 | Chen et al. | |
| 8,972,689 B1 | 3/2015 | de la Iglesia | |
| 2003/0067699 A1 * | 4/2003 | Thomson | G06F 3/0608 360/46 |
| 2011/0238928 A1 | 9/2011 | Abe et al. | |
| 2012/0246435 A1 | 9/2012 | Meir et al. | |
| 2015/0149625 A1 * | 5/2015 | Piro, Jr. | H04L 12/1403 709/224 |
| 2015/0295802 A1 * | 10/2015 | Balakrishnan | H04L 43/0811 370/248 |
| 2016/0070483 A1 * | 3/2016 | Yoon | G06F 13/1689 711/154 |

FOREIGN PATENT DOCUMENTS

WO    2014126263    8/2014

OTHER PUBLICATIONS

FlashDBA, "Understanding Flash: Blocks, Pages and Program/Erases", [online], Jun. 20, 2014, [retrieved on Mar. 25, 2015], Retrieved from the Internet at <URL: http://flashdba.com/2014/06/20/understanding-flash-blocks-pages-and . . .>, 4 pp.

(Continued)

*Primary Examiner* — Charles Rones
*Assistant Examiner* — Han Doan
(74) *Attorney, Agent, or Firm* — Konrad Raynes Davda & Victor LLP; Rabindranath Dutta

(57) ABSTRACT

Provided are a method, apparatus, and a system for measuring latency of a storage device. The storage device measures one or more latencies of one or more input/output (I/O) operations received from a host. The storage device transmits information on the one or more latencies to the host.

18 Claims, 7 Drawing Sheets

(56) References Cited

OTHER PUBLICATIONS

Gilbert, H., "The Bus (PCI and PCI-Express)", [online], Jan. 4, 2008, [retrieved Mar. 25, 2015], Retrieved from the Internet at <URL: http://www.yale.edu/pclt/PCHW/BUS.HTM>, 5 pp.
NVM Express, Inc., "NVM Express", Revision 1.2, Nov. 3, 2014, 205 pp.
Serial ATA International Organization, "Serial ATA Revision 3.2", Aug. 7, 2013, 874 pp. (Submitted in two parts to comply with EFS-Web file size limits—Part A: 142 pp; Part B: 732 pp.).
Wikipedia, "Serial ATA", [online], last modified Mar. 25, 2015, [Retrieved on Mar. 25, 2015], Retrieved from the Internet at <URL: http://en.wikipedia.org/w/index.php?title=Serial_ATA&oldid=653444462>, 22 pp.
International Search Report and Written Opinion for International Application No. PCT/US2016/019956, dated Jun. 10, 2016, 10 pp.
International Preliminary Report on Patentability for International Application No. PCT/US2016/019956, dated Oct. 12, 2017, 7 pp.

* cited by examiner

US 10,025,535 B2

MEASUREMENT AND REPORTING OF THE LATENCY OF INPUT AND OUTPUT OPERATIONS BY A SOLID STATE DRIVE TO A HOST

BACKGROUND

A solid state drive (SSD) is a data storage device that uses integrated circuit assemblies as memory to store data persistently. The SSD may be coupled to a host computing system, such as a personal computer or a server, where the host computing system performs input/output (I/O) operations on the SSD, and where the I/O operations may include writing data to the SSD and reading data from the SSD.

When an I/O operation is transmitted from the host computing system to the SSD and the results of the processing of the I/O operation are returned back from the SSD to the host computing system, the total time taken for the roundtrip is referred to as the latency of the I/O operation. In other words, the latency refers to the time interval or delay during which the host computing system is waiting for receiving the results of the I/O operation from the SSD. In certain systems, latency measurement mechanisms are implemented within the host computing system. In such mechanisms, the host computing system measures the latency of the I/O operations sent to the SSD or to other storage devices coupled to the host computing system.

BRIEF DESCRIPTION OF THE DRAWINGS

Referring now to the drawings in which like reference numbers represent corresponding parts throughout.

DETAILED DESCRIPTION

If a host computing system is used to measure the latencies of I/O operations transmitted from a host computing system to a storage device, then the measured latencies may be affected by the time consumed by a resource intensive program that executes in the host computing system to measure the latencies. Additionally, coupling components that couple the host computing system to the storage device may increase the measured latencies of the I/O operations. It may be difficult to separate latencies due to the storage device from those introduced by the operating system of the host computing system, the storage fabric, the host backplane, etc. Moreover, measuring latency in the host computing system may use software and hardware resources that may be better utilized for other tasks. Such latency measurements by the host computing system may be affected by the system software overhead and the noise introduced outside the storage device.

In certain embodiments, the SSD may record its own latency and this may allow the host computing system to determine the latency of I/O operations without consuming resources and assist in the debugging of latency issues. In certain embodiments, the SSD may record the time at which a read/write command (i.e., an I/O operation) is received and likewise the time at which the command is completed and sent back over a bus to the host computing system. This calculated latency for each I/O operation may then be placed in various buckets and counted, where each bucket is a latency interval. The latency buckets and I/O counts may be communicated to the host computing system upon request. Thus, in certain embodiments, host resources are not consumed to measure latency.

In the following description, reference is made to the accompanying drawings which form a part hereof and which illustrate several embodiments. It is understood that other embodiments may be utilized and structural and operational changes may be made.

Figure 1:
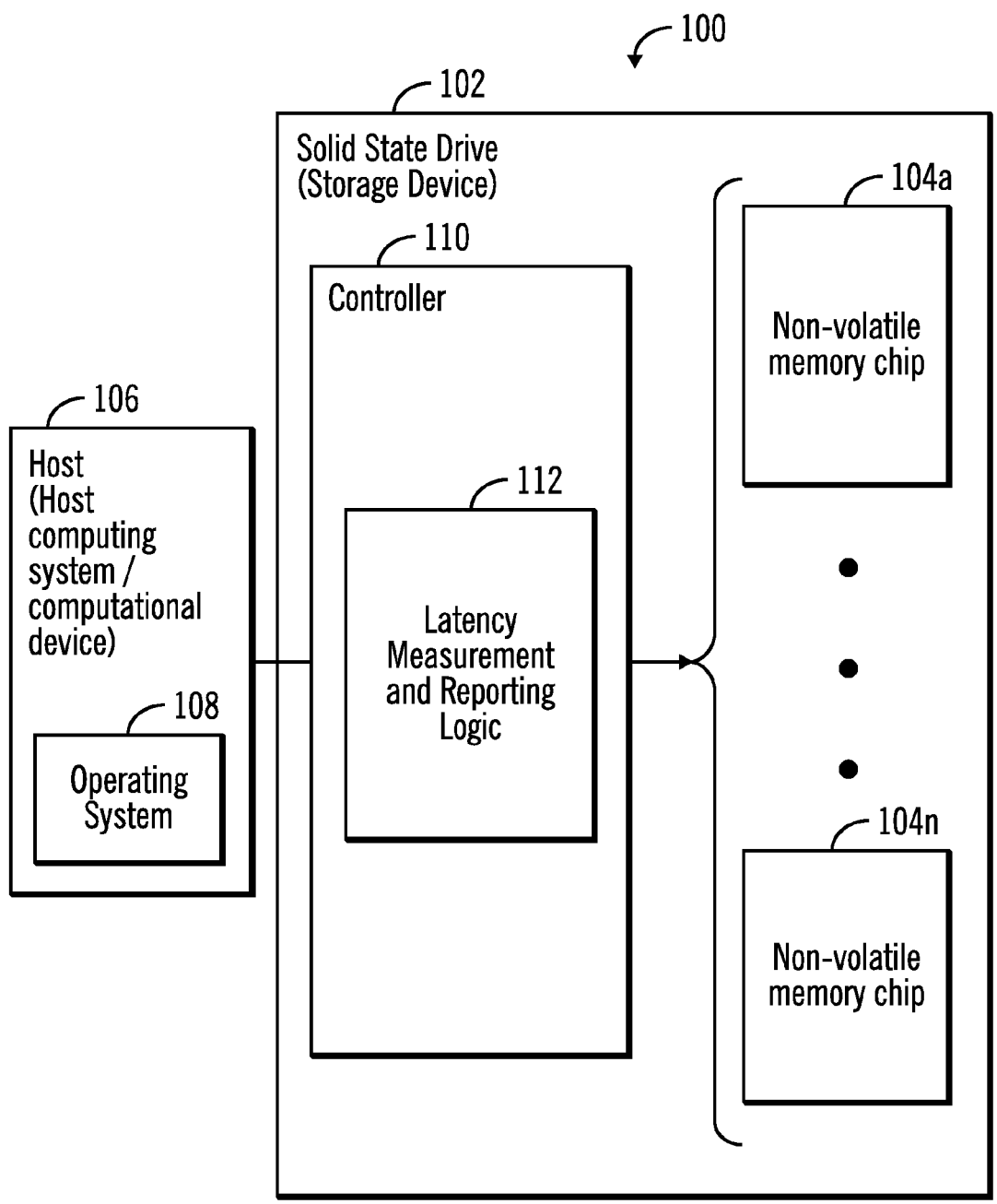
FIG. 1 illustrates a block diagram of a computing environment in which a storage device, such as a SSD, is coupled to a host, in accordance with certain embodiments.

FIG. 1 illustrates a block diagram of a computing environment 100 in which a storage device, such as a SSD 102 with one or more non-volatile memory chips 104a ... 104n is coupled to a host 106, in accordance with certain embodiments. A non-volatile memory chip (also referred to as a package) may include one or more dies, where a die is the smallest unit that may independently execute commands or report status. Each die may include one or more planes, where identical, concurrent operations may take place on each plane. Each plane may include a number of blocks, which are the smallest unit that may be erased. Each block may include a number of pages, which are the smallest unit that may be programmed.

The solid state drive 102 may be comprised of non-volatile memory, such as NAND memory included in the non-volatile memory chips 104a ... 104n, NOR memory or some other suitable non-volatile memory. In certain embodiments, the solid state drive 102 may be capable of storing several terabytes of data or more. Certain embodiments may be applied to other types of non-volatile memory, phase change memory (PCM), a three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, byte addressable random access non-volatile memory, etc. In certain embodiments, the storage device 102 may be comprised of some other type of device besides a solid state drive. For example, in certain embodiments the storage device 102 may be comprised of a disk drive, a tape drive, etc.

In certain embodiments, the host 106 may be comprised of any suitable computational device, such as a personal computer, a mainframe, a telephony device, a smart phone, a storage controller, a blade computer, a processor with memory, etc. The host 106 may be referred to as a host computing system or as a computational device. The host 106 may communicate with the SSD 102 over a bus (such as Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc. Further details of the SATA specification may be found in the publication titled "Serial ATA Specification, Revision 3.2," released August 2013, by SATA International Organization (SATA-IO), Beaverton, Oreg. In another example, the interface and/or interconnect protocol may comply and/or be compatible with an NVMe (Non-Volatile Memory Host Controller Interface Express). Further details of NVMe may be found in the publication titled "NVM Express™, Revision 1.2," released Nov. 3, 2014 by NVM Express™ Work Group, and/or earlier and/or later versions of this specification (NVM Express is a trademark of NVM Express, Inc.).

In FIG. 1 the solid state drive 102 has been shown as being external to the host 106. In alternative embodiments, the solid state drive 102 may be included within a chassis of the host 106. The host 106 may have an operating system 108 that interacts with the solid state drive 102 to perform I/O operations.

The solid state drive 102 includes a controller 110 implemented in firmware, hardware, software or any combination thereof. The controller 110 a latency measurement and reporting logic 112 that may be implemented in firmware, hardware, software of any combination thereof.

In certain embodiments illustrated in FIG. 1, the latency measurement and reporting logic 112 measures the latencies of I/O operations processed by the solid state drive 102 and reports the latencies of the I/O operations to the host 106, either at periodic intervals or in response to a request from the host 106. The I/O operations may include a request to perform read operations on one or more of the non-volatile chips 104a . . . 104n, or a request to perform write operations on one or more of the non-volatile memory chips 104a . . . 104n.

Figure 2:
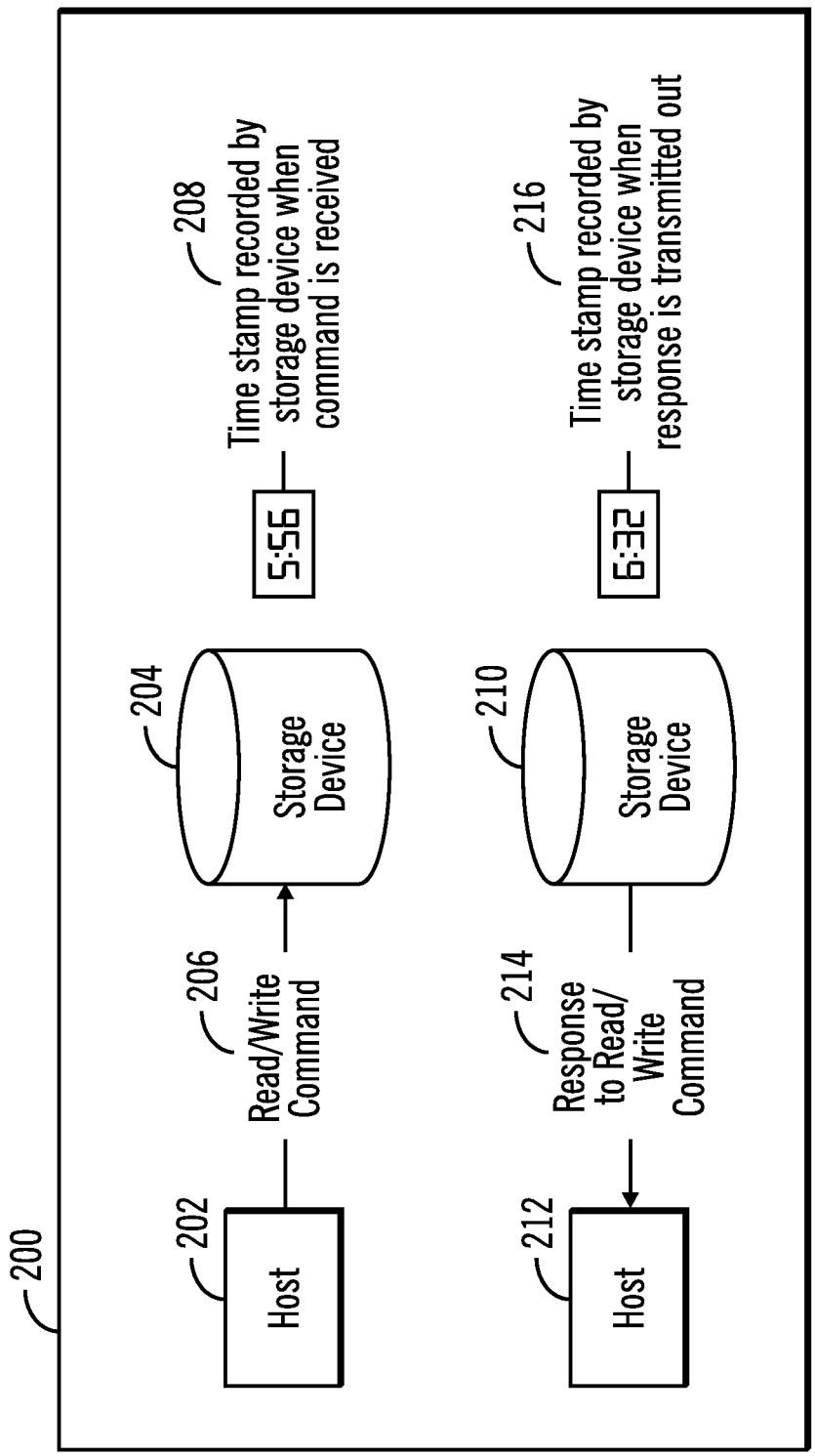
FIG. 2 illustrates a block diagram that shows how the storage device records the latency of an I/O operation, in accordance with certain embodiments.

FIG. 2 illustrates a block diagram 200 that shows how a storage device records the latency of an I/O operation, in accordance with certain embodiments. In certain embodiments, the latency measurement and reporting logic 112 that executes within the storage device performs the operations shown in FIG. 2.

The host (shown via reference numeral 202) may send a read or a write command to the storage device (shown via reference numeral 204), where the transmission of the read or the write command is shown via reference numeral 206. The host (shown via reference numeral 202) may send the read or write command to the storage device (shown via reference numeral 204) over a bus, such as, PCIe, SATA, SAS, etc., or over a network, such as the Internet, a SAN, a LAN, etc. For example, PCIe is a high speed I/O bus in which multiple lanes may combine their data transfer capability to send the read or write command from the host to the storage device, whereas SATA may use a high-speed serial cable to send the read or write command from the host to the storage device. In certain embodiments that use interfaces in accordance with the SATA Express specification Revision 3.2, an interface that combines both SATA and PCIe buses may be used to send the read or write commands from the host to the storage device. The storage device records a time stamp 208 to indicate the time at which the read or the write command was received by the storage device from the host. In certain embodiments, the time stamp 208 indicates the time when the entirety of the read or the write command is received by the storage device. For example, in the case of a read command the time stamp 208 may record when the last byte of the read command is received by the storage device, and in the case of a write command the time stamp 208 may record when the last byte of data to be written is received by the storage device. In alternative embodiments, other indications related to the receiving of the read or write command may be used to record the time of receiving the read or write command in the time stamp 208. Since the storage device has an internal clock the internal clock may be used to determine the time for the recording the time stamp.

Then the storage device processes the read or the write command, and subsequently the storage device (shown via reference numeral 210) sends the response 214 to the read or the write command to the host (shown via reference numeral 212). The response 214 includes the data generated via the processing of the read or the write command. The data included in the response 214 may be of a considerable size (e.g., in the case of a read command) For example, in certain embodiments, the response includes a plurality of bytes of data (e.g., one or more kilobytes of data, one or more megabytes of data, etc., in response to a read command) In responding to a read command, the storage device records a time stamp 216 at the time at which the last byte of the data included in the response to the read command from host is transmitted by the storage device. In responding to the write command from the host, the storage device records in the timestamp 216, the time at which the last byte of data is sent to the host to inform the host that that data requested to be written by the write command has been written to the non-volatile memory chips 104a . . . 104n. The number of bytes of data sent in response to a write request is usually much smaller than the number of bytes of data sent in response to a read request. In response to a write request, the number of bytes of data that are sent may just inform the host that the write operation has completed in the storage device, whereas in response to a read request, the number of bytes of data that are sent may include the data that is read from the storage device.

Figure 3:
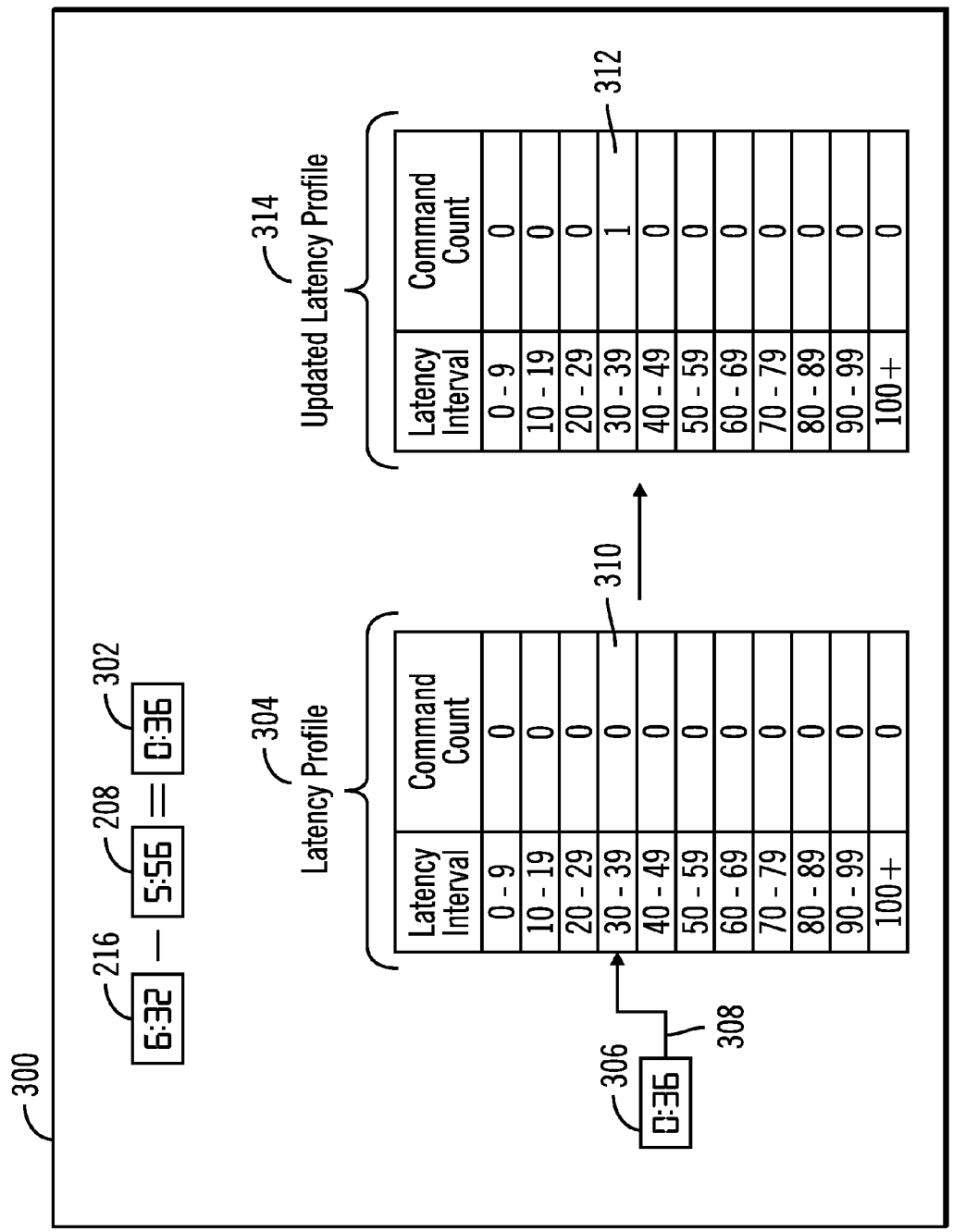
FIG. 3 illustrates a block diagram that shows how the storage device maintains a latency profile that records the number of I/O operations processed at different intervals of latencies, in accordance with certain embodiments.

FIG. 3 illustrates a block diagram 300 that shows how the storage device maintains a latency profile that records the number of I/O operations processed at different intervals of latencies, in accordance with certain embodiments. In certain embodiments, the latency measurement and reporting logic 112 that executes within the storage device performs the operations shown in FIG. 3.

The difference 302 between the time stamp 216 and the time stamp 208 is the latency of the read or the write command Since the timestamp 216 is the time at which the last byte of the data included in the response to the host is transmitted by the storage device, therefore, latency is not only dependent on the time to perform the reading of data from the non-volatile memory chips 104a . . . 104n or the writing of the data to the non-volatile memory chips 104a . . . 104n, but is also dependent on the size of the data transfer to the host. Latency may also differ between read and write operations depending on the amount of data that is read or written. In the above example if the time stamp 208 is "6:32" and the "time stamp" 208 is "5:56" (as shown earlier in FIG. 2), then the latency for the read or the write operation is "0:36" as shown via reference numeral 302 and this latency is calculated by the latency measurement and reporting logic 112 that executes within the storage device. The units for the timestamps 208, 214 and the difference 302 may be any unit of time such as microseconds, milliseconds, nanoseconds, etc.

Since there may be many thousands, hundreds of thousands, or more of I/O operations, storing separate latencies for each I/O operation may need a significant amount of storage space in the storage device. To reduce the amount of storage space needed for recording latencies, the storage device may maintain a latency profile 304 of a plurality of I/O operations in the form of a table or some other data structure. For example, latencies may be maintained in certain latency intervals (e.g. microseconds, milliseconds or some other unit). In FIG. 3, in the latency profile 304 there are ten latency intervals each of 10 units of time (e.g. milliseconds or microseconds or some other unit of time) between 0 and 99, and another latency interval that captures all latencies over 100 units of time. The latency intervals may also be referred to as latency ranges.

The latency measurement and reporting logic 112 may map the time stamp difference (i.e., the latency shown via reference numeral 306) of "0:36" to the latency interval "30-39" shown via reference numeral 308 and increment the command count 310 by 1 for this latency interval "30-39" and the incremented command count is shown via reference numeral 312 in the updated latency profile 314. Thus for each latency interval (i.e., latency range), the number of host I/O operations that fall within that latency interval is recorded in the latency profile.

As more and more I/O operations are received by the storage device, the latency profile is updated. At any point in time, the latency profile indicates the number of I/O commands that had latencies that fell within each latency interval.

Figure 4:
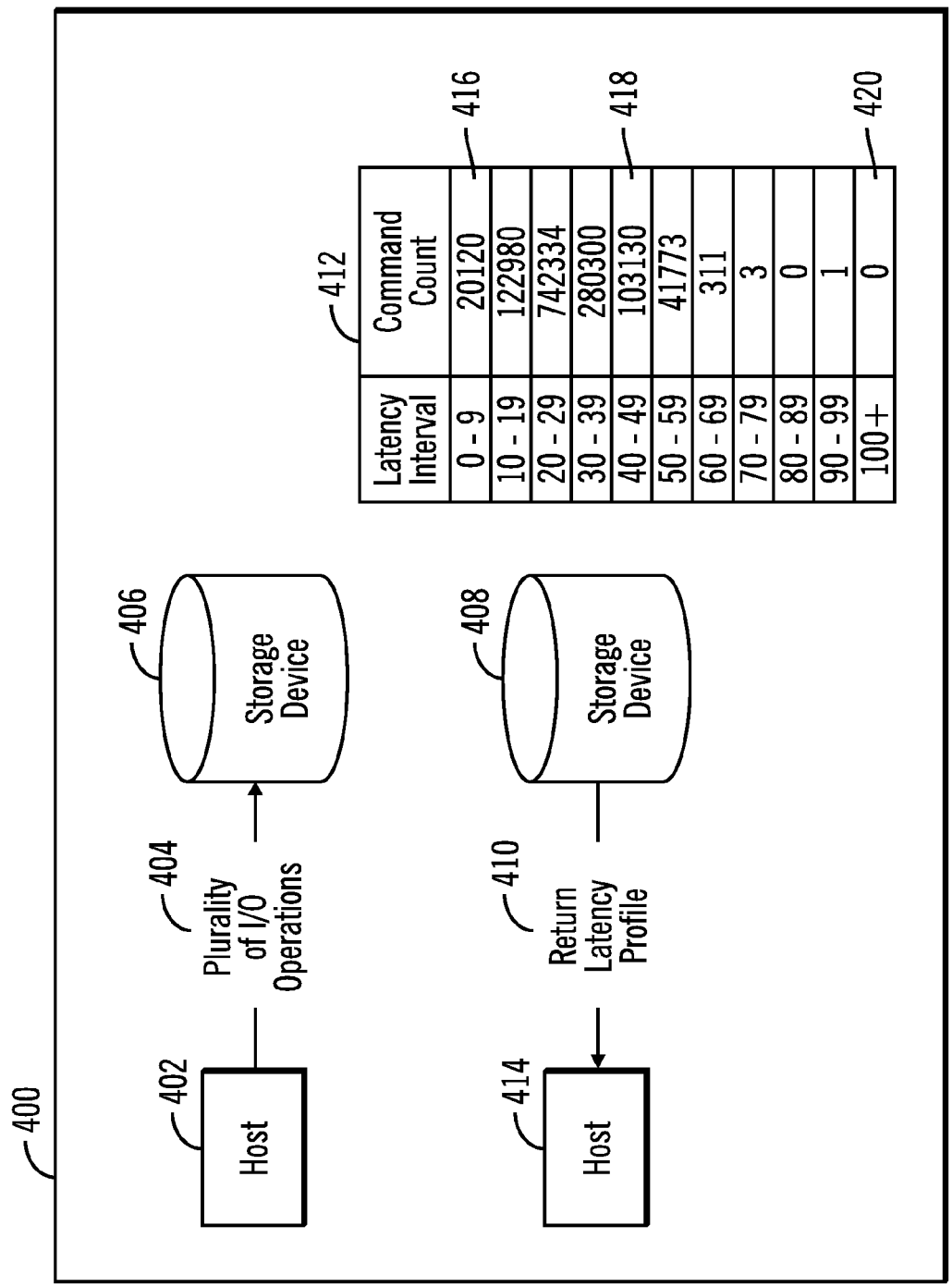
FIG. 4 illustrates a block diagram that shows the returning of the latency profile from the storage device to the host, in accordance with certain embodiments.

FIG. 4 illustrates a block diagram 400 that shows the returning of the latency profile from the storage device to the host, in accordance with certain embodiments. In certain embodiments, the latency measurement and reporting logic 112 that executes with the storage device performs the operations shown in FIG. 4.

In certain embodiments, after the host (reference numeral 402) has sent (reference numeral 404) a plurality of I/O operations 404 to the storage device (reference numeral 406) the host may request a latency profile from the storage device. In response to receiving the request, the storage device (reference numeral 408) returns (shown via reference numeral 410) the latency profile 412 to the host (reference numeral 414). The latency profile 412 shows that 20,120 I/O commands had latencies that fell between 0 and 9 units of time (reference numeral 416), 103,130 I/O commands had latencies that fell between 40-49 units of time (reference numeral 418), and that no I/O command had a latency of 100 or more units of time (reference numeral 420).

Thus FIGS. 1-4 illustrate certain embodiments in which a storage device computes the latencies of a plurality of I/O operations, and populates a latency profile in which a count of the number of I/O operations at different intervals of latencies are maintained. In response to a request from the host, the storage device transmits the latency profile to the host.

Figure 5:
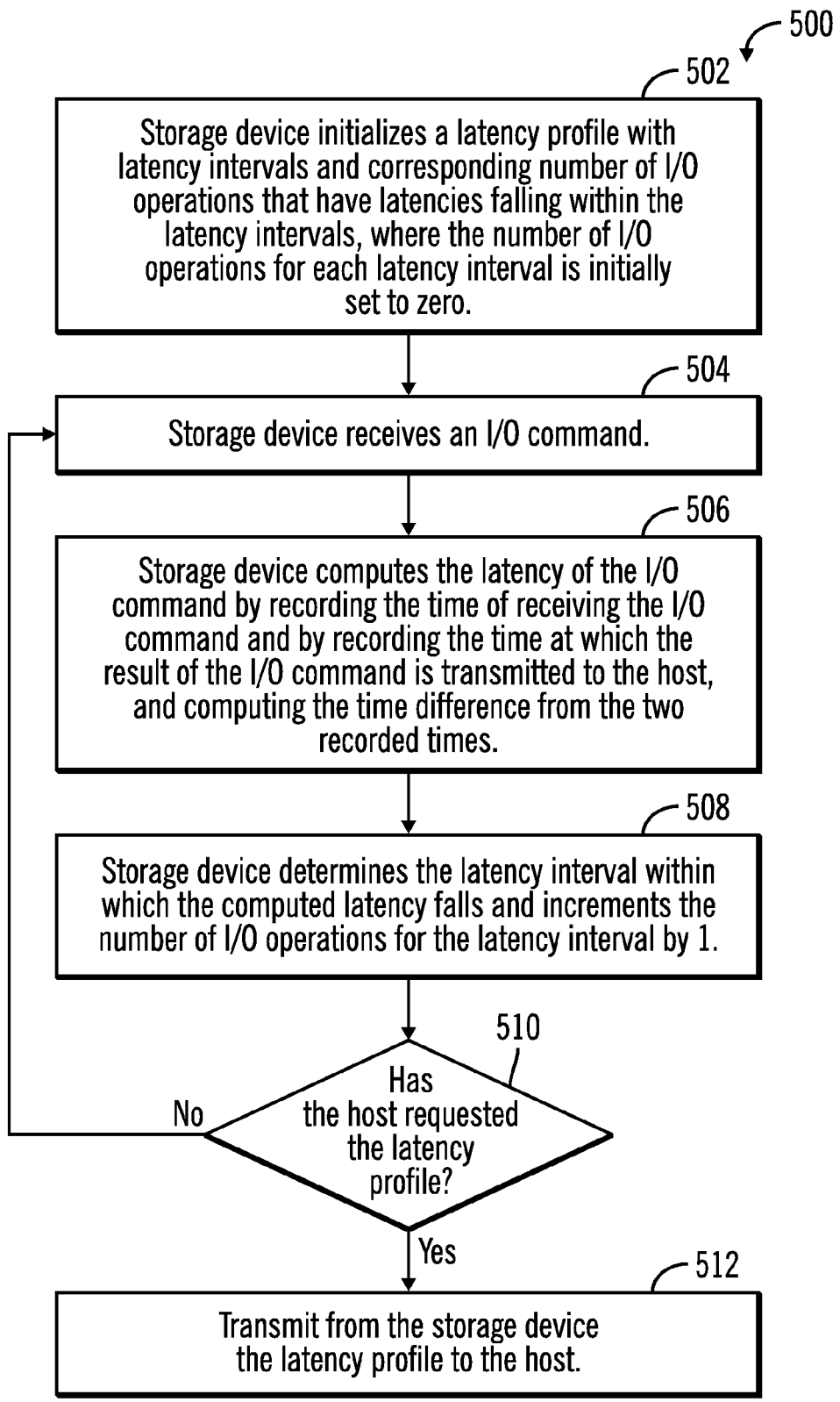
FIG. 5 illustrates a first flowchart that shows the measurement and reporting of the latency of input and output operations by a storage device to a host, in accordance with certain embodiments.

FIG. 5 illustrates a flowchart 500 that shows the measurement and reporting of the latency of input and output operations by a storage device 102, in accordance with certain embodiments. In certain embodiments, the latency measurement and reporting logic 112 that executes with the storage device 102 performs the operations shown in FIG. 5.

Control starts at block 502 in which a storage device 102 (e.g., a SSD) initializes a latency profile with latency intervals and a corresponding number of I/O operations that have latencies falling within the latency intervals, where the number of I/O operations for each latency interval is initially set to zero (as shown in FIG. 3 in the latency profile 304).

The storage device 102 receives (at block 504) an I/O command (i.e., an I/O operation) from the host 106. The storage device 102 computes (at block 506) the latency of the I/O command by recording the time of receiving the I/O command (referred to as a first recorded time) and by recording the time at which the result of the I/O command is transmitted to the host 106 (referred to as the second recorded time), and computing the time difference from the two recorded times. If the I/O command is a read operation then the second of the two recorded times is the time at which the final block of data requested by the host is sent from the storage device to the host. If the I/O command is a write command, then the second of the two recorded times is the time at which the storage device responds to the host that the write operation is completed in the storage device. The first recorded time is the time at which the entirety of the I/O command is received by the storage device. Thus the latency is the difference between the second recorded time and the first recorded time. In alternative embodiments other times may be recorded for measuring the latency of the storage device.

Control proceeds to block 508 in which the storage device 102 determines the latency interval within which the computed latency falls and increments the number of I/O operations for the latency interval by 1 (as shown in FIG. 3). Subsequently, the storage device 102 determines (at block 510) whether the host 106 has requested the latency profile. If so, then the storage device 102 transmits (at block 512) the latency profile to the host 106. If not, then control proceeds to block 504 in which the storage device 102 receives another I/O command from the host 106.

It should be noted that the storage device 102 may process more than one I/O operation in parallel and may compute latencies in parallel for a plurality of I/O operations and may update the latency profile in parallel.

Figure 6:
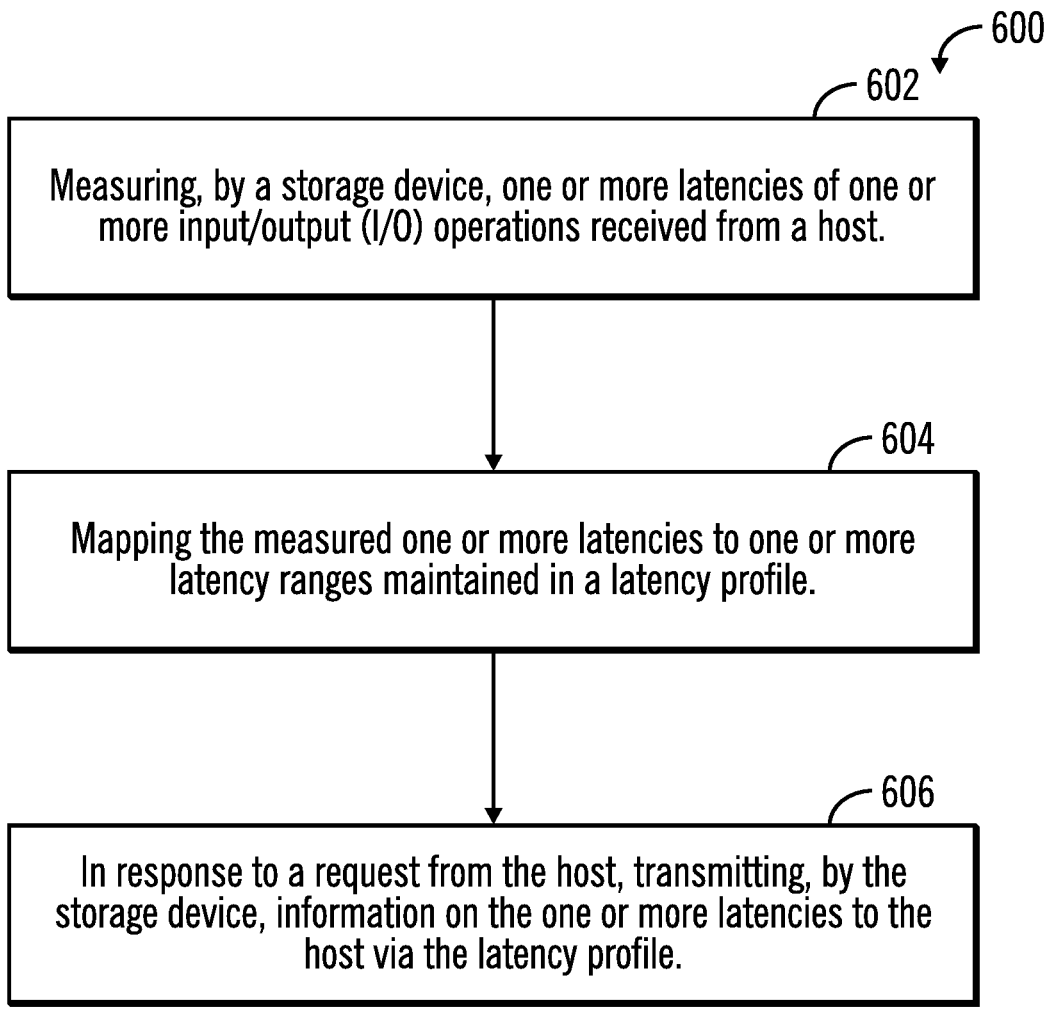
FIG. 6 illustrates a second flowchart that shows the measurement and reporting of the latency of input and output operations by a storage device to a host, in accordance with certain embodiments.

FIG. 6 illustrates a second flowchart 600 that shows the measurement and reporting of the latency of input and output operations by a storage device 102, in accordance with certain embodiments. In certain embodiments, the latency measurement and reporting logic 112 that executes with the storage device performs the operations shown in FIG. 6.

Control starts at block 602 in which a storage device 102 measures one or more latencies of one or more input/output (I/O) operations received from a host 106. The storage device 102 maps (at block 604) the measured one or more latencies to one or more latency ranges maintained in a latency profile. In response to a request from the host 106, the storage device 102 transmits (at block 606) the information on the one or more latencies to the host via the latency profile.

Therefore, FIGS. 1-6 illustrate certain embodiments in which a latency profile is generated for a plurality of I/O operations in a storage device 102. In response to a request from a host 106 (e.g., a request sent over one or more lanes of a PCIe interface, or over a SATA interface from the host 106 to the storage device 102), the latency profile is transmitted over the one or more lanes of a PCIe interface or over the SATA interface by the storage device to the host 106. Other interfaces may be used to communicate between the host 106 and the storage device 102. As a result, the latency profile is not affected by delays in the host 106 or via coupling elements between the host 106 and storage device 102.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 7:
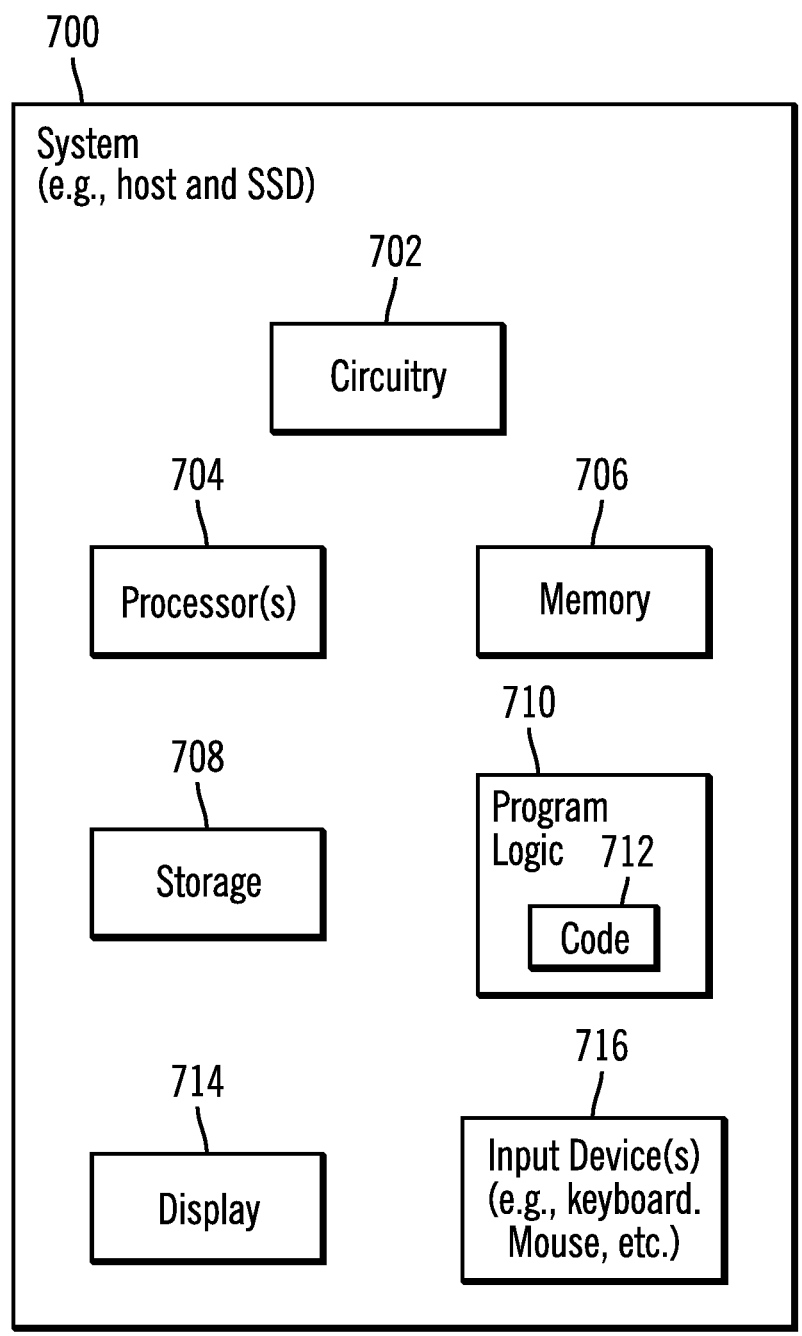
FIG. 7 illustrates a block diagram of a device including a solid state drive or a computational device, in accordance with certain embodiments.

FIG. 7 illustrates a block diagram of a system 700 that includes both the host 106 (the host 106 comprises at least a processor) and the solid state drive 102, in accordance with certain embodiments. For example, in certain embodiments the system 700 may be a computer (e.g., a laptop computer, a desktop computer, a tablet, a cell phone or any other suitable computational device) that has the host 106 and the solid state drive 102 both included in the system 700. For example, in certain embodiments the system 700 may be a laptop computer that includes the solid state drive 102. The system 700 may include a circuitry 702 that may in certain embodiments include at least a processor 704. The system 700 may also include a memory 706 (e.g., a volatile memory device), and storage 708. The storage 708 may include the solid state drive 102 or other drives or devices including a non-volatile memory device (e.g., EEPROM, ROM, PROM, flash, firmware, programmable logic, etc.). The storage 708 may also include a magnetic disk drive, an optical disk drive, a tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702. The system 700 may also include a display 714 (e.g., an liquid crystal display (LCD), a light emitting diode (LED) display, a cathode ray tube (CRT) display, a touchscreen display, or any other suitable display). The system 700 may also include one or more input devices 716, such as, a keyboard, a mouse, a joystick, a trackpad, or any other suitable input devices). Other components or devices beyond those shown in FIG. 7 may also be found in the system 700.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiment.

Example 1 is a method for measuring latency of a storage device. A storage devices measures one or more latencies of one or more input/output (I/O) operations received from a host. The storage device transmits information on the one or more latencies to the host.

In example 2, the subject matter of example 1 may include that the storage device is a solid state drive (SSD).

In example 3, the subject matter of example 2 may include recording, by the SSD, a first time at which an I/O operation is received from the host; recording, by the SSD, a second time at which the SSD transmits a response to the I/O operation to the host; and determining a latency of the I/O operation to be a time duration between the second time and the first time.

In example 4, the subject matter of example 3 may include maintaining a plurality of latency ranges; and determining how many of the one or more I/O operations have latencies that fall within each of the plurality of latency ranges, to generate a latency profile for the SSD.

In example 5, the subject matter of example 4 may include that in response to a request from the host, the SSD transmits the latency profile to the host.

In example 6, the subject matter of example 1 may include that the measured one or more latencies are mapped to one or more latency ranges maintained in a latency profile, wherein the measured one or more latencies are transmitted to the host via the latency profile to transmit the information on the one or more latencies to the host.

In example 7, the subject matter of example 1 may include that all measurements of the one or more latencies are performed in the storage device and no measurements of the one or more latencies are performed in the host.

In example 8, the subject matter of example 7 may include that by measuring the one or more latencies in the storage device and not in the host, the measurements of the one or more latencies do not include delays introduced by extraneous effects of processes that execute in the host.

Example 9 is an apparatus comprising a plurality of non-volatile memory chips; and a controller coupled to the plurality of non-volatile memory chips, wherein the controller is operable to: measure one or more latencies of one or more input/output (I/O) operations received from a host; and transmit information on the one or more latencies to the host.

In example 10, the subject matter of example 9 may include that the apparatus comprises a solid state drive (SSD).

In example 11, the subject matter of example 10 may include that the controller is further operable to: record a first time at which an I/O operation is received from the host; recording a second time at which the SSD transmits a response to the I/O operation to the host; and determine a latency of the I/O operation to be a time duration between the second time and the first time.

In example 12, the subject matter of example 11 may include that the controller is further operable to: maintain a plurality of latency ranges; and determine how many of the one or more I/O operations have latencies that fall within each of the plurality of latency ranges, to generate a latency profile for the SSD.

In example 13, the subject matter of example 12 may include that the controller is further operable to: in response to a request from the host, transmit the latency profile to the host.

In example 14, the subject matter of example 9 may include that the measured one or more latencies are mapped to one or more latency ranges maintained in a latency profile, wherein the measured one or more latencies are transmitted to the host via the latency profile to transmit the information on the one or more latencies to the host.

In example 15, the subject matter of example 9 may include that all measurements of the one or more latencies are performed in the storage device and no measurements of the one or more latencies are performed in the host.

In example 16, the subject matter of example 15 may include that by measuring the one or more latencies in the storage device and not in the host, the measurements of the one or more latencies do not include delays introduced by extraneous effects of processes that execute in the host.

Example 17 is a system comprising a solid state drive (SSD) comprising a plurality of non-volatile memory chips; a display; and a processor coupled to the solid state drive and the display, wherein, the SSD is operable to: measure one or more latencies of one or more input/output (I/O) operations received from a host; and transmit information on the one or more latencies to the host.

In example 18, the subject matter of example 9 may include that host is included in the system and coupled to the SSD, and the processor is included in the host.

In example 19, the subject matter of example 18 may include that the SSD is further operable to: record a first time at which an I/O operation is received from the host; recording a second time at which the SSD transmits a response to the I/O operation to the host; and determine a latency of the I/O operation to be a time duration between the second time and the first time.

In example 20, the subject matter of example 19 may include that the SSD is further operable to: maintain a plurality of latency ranges; and determine how many of the one or more I/O operations have latencies that fall within each of the plurality of latency ranges, to generate a latency profile for the SSD.

In example 21, the subject matter of example 20 may include that the SSD is further operable to: in response to a request from the host, transmit the latency profile to the host.

In example 22, the subject matter of example 17 may include that the measured one or more latencies are mapped to one or more latency ranges maintained in a latency profile, wherein the measured one or more latencies are transmitted to the host via the latency profile to transmit the information on the one or more latencies to the host.

In example 23, the subject matter of example 17 may include that all measurements of the one or more latencies are performed in the storage device and no measurements of the one or more latencies are performed in the host.

In example 24, the subject matter of example 23 may include that by measuring the one or more latencies in the storage device and not in the host, the measurements of the one or more latencies do not include delays introduced by extraneous effects of processes that execute in the host.

What is claimed is:

1. A method for measuring latency of a solid state drive (SSD), the method comprising:
   initializing, by the SSD, a latency profile comprising latency intervals and corresponding number of I/O operations that have latencies falling within the latency intervals and initially setting number of I/O operations for each latency interval to zero;
   in response to receiving one or more input/output (I/O) operations by the SSD from a host, measuring, by a logic included in a controller within the SSD, one or more latencies of the one or more input/output (I/O) operations received from the host, wherein the logic measures a latency of an I/O operation that comprises a write I/O operation received from the host by computing a time difference between a time of receiving at the SSD, a last byte of data to be written to the SSD from the host, and a time at which a last byte of data of a response to the write I/O operation is sent by the SSD to the host to communicate to the host that data corresponding to the write I/O operation has been written to one or more non-volatile memory chips of the SSD;
   for each I/O operation of the one or more I/O operations received by the SSD from the host, determining a latency interval within which the latency of the I/O operation falls and incrementing the number of I/O operations for the latency interval by one; and
   in response to determining that that host has requested the latency profile, transmitting from the SSD the latency profile to the host, wherein all measurements of the one or more latencies are performed in the SSD and no measurements of the one or more latencies are performed in the host, and wherein by measuring the one or more latencies in the SSD and not in the host, the measurements of the one or more latencies do not include delays introduced by extraneous effects of processes that execute in the host.

2. The method of claim 1, the method further comprising:
   recording, by the SSD, a first time at which the I/O operation is received from the host;
   recording, by the SSD, a second time at which the SSD transmits a response to the I/O operation to the host; and
   determining a latency of the I/O operation to be a time duration between the second time and the first time.

3. The method of claim 1, wherein the logic measures a latency of a read I/O operation received from the host by computing a time difference between a time of receiving at the SSD, a last byte of the read I/O operation from the host, and a time at which a last byte of data of a response to the read I/O operation is sent to the host by the SSD.

4. The method of claim 3, wherein an internal clock of the SSD is used to record timestamps for computing time differences.

5. The method of claim 4, wherein the one or more latencies are unaffected by delays in the host and coupling elements between the host and the SSD.

6. The method of claim 1, wherein the SSD is configured to communicate with the host over a network, and wherein the one or more latencies are unaffected by delays in the network.

7. An apparatus, comprising:
   a plurality of non-volatile memory chips; and
   a controller coupled to the plurality of non-volatile memory chips, wherein logic included in the controller is operable to:
   initialize a latency profile comprising latency intervals and corresponding number of I/O operations that have latencies falling within the latency intervals and initially set a number of I/O operations for each latency interval to zero;
   in response to receiving one or more input/output (I/O) operations from a host, measure one or more latencies of the one or more input/output (I/O) operations received from the host, wherein the logic measures a latency of an I/O operation that comprises a write I/O operation received from the host by computing a time difference between a time of receiving a last byte of data to be written from the host, and a time at which a last byte of data of a response to the write I/O operation is sent to the host to communicate to the host that data corresponding to the write I/O operation has been written to one or more of the plurality of non-volatile memory chips;
   for each I/O operation of the one or more I/O operations received from the host, determine a latency interval within which the latency of the I/O operation falls and increment the number of I/O operations for the latency interval by one; and
   in response to determining that that host has requested the latency profile, transmit the latency profile to the host, wherein all measurements of the one or more latencies are performed in the apparatus and no measurements of the one or more latencies are performed in the host, and wherein by measuring the one or more latencies in the apparatus and not in the host, the measurements of the one or more latencies do not include delays introduced by extraneous effects of processes that execute in the host.

8. The apparatus of claim 7, wherein the logic included in the controller is further operable to:
   record a first time at which the I/O operation is received from the host;
   record a second time at which the apparatus transmits a response to the I/O operation to the host; and
   determine a latency of the I/O operation to be a time duration between the second time and the first time.

9. The apparatus of claim 7, wherein the logic is further operable to measure a latency of a read I/O operation received from the host by computing a time difference between a time of receiving at the apparatus, a last byte of the read I/O operation from the host, and a time at which a last byte of data of a response to the read I/O operation is sent to the host by the apparatus.

10. The apparatus of claim 9, wherein an internal clock of the apparatus is used to record timestamps for computing time differences.

11. The apparatus of claim 10, wherein the one of more latencies are unaffected by delays in the host and coupling elements between the host and the apparatus.

12. The apparatus of claim 7, wherein the apparatus is configured to communicate with the host over a network, and wherein the one or more latencies are unaffected by delays in the network.

13. A system, comprising:
    a solid state drive (SSD) comprising a plurality of non-volatile memory chips;
    a display; and
    a processor coupled to the solid state drive and the display, wherein logic included in a controller within the SSD is operable to:
    initialize, by the SSD, a latency profile comprising latency intervals and corresponding number of I/O operations that have latencies falling within the latency intervals and initially set number of I/O operations for each latency interval to zero;

in response to receiving one or more input/output (I/O) operations by the SSD from a host, measure, by a logic included in a controller within the SSD, one or more latencies of the one or more input/output (I/O) operations received from the host, wherein the logic measures a latency of an I/O operation that comprises a write I/O operation received from the host by computing a time difference between a time of receiving at the SSD, a last byte of data to be written to the SSD from the host, and a time at which a last byte of data of a response to the write I/O operation is sent by the SSD to the host to communicate to the host that data corresponding to the write I/O operation has been written to one or more non-volatile memory chips of the SSD;

for each I/O operation of the one or more I/O operations received by the SSD from the host, determine a latency interval within which the latency of the I/O operation falls and increment the number of I/O operations for the latency interval by one; and in response to determining that that host has requested the latency profile, transmit from the SSD the latency profile to the host, wherein all measurements of the one or more latencies are performed in the SSD and no measurements of the one or more latencies are performed in the host, and wherein by measuring the one or more latencies in the SSD and not in the host, the measurements of the one or more latencies do not include delays introduced by extraneous effects of processes that execute in the host.

14. The system of claim 13, wherein the host is included in the system and coupled to the SSD, and the processor is included in the host, wherein the logic included in the SSD is further operable to:

record a first time at which the I/O operation is received from the host;

record a second time at which the SSD transmits a response to the I/O operation to the host; and determine a latency of the I/O operation to be a time duration between the second time and the first time.

15. The system of claim 13, wherein the logic is further operable to measure a latency of a read I/O operation received from the host by computing a time difference between a time of receiving at the SSD, a last byte of the read I/O operation from the host, and a time at which a last byte of data of a response to the read I/O operation is sent to the host by the SSD.

16. The system of claim 15, wherein an internal clock of the SSD is used to record timestamps for computing time differences.

17. The system of claim 16, wherein the one of more latencies are unaffected by delays in the host and coupling elements between the host and the SSD.

18. The system of claim 13, wherein the SSD is configured to communicate with the host over a network, and wherein the one of more latencies are unaffected by delays in the network.

* * * * *